United States Patent Office 2,984,672
Patented May 16, 1961

2,984,672

METHOD FOR THE PREPARATION OF PYRROLINONES

Newman M. Bortnick, Oreland, and Marian F. Fegley, Mont Clare, Pa., assignors to Rohm & Haas Company, Philadelphia, Pa., a corporation of Delaware No Drawing. Filed May 14, 1958, Ser. No. 735,124

6 Claims. (Cl. 260—326.5)

This invention is concerned with a method for the preparation of pyrrolinones.

One embodiment of this invention consists in the hydrolysis of iminopyrrolines. It is preferred actually to produce pyrrolinones according to this invention by reacting specific ketonitriles with specific amines in an aqueous medium. The latter embodiment is actually a modification of the former embodiment in that under particular conditions, the specific ketonitriles and specific amines react to form iminopyrrolines as taught by our copending application, Serial No. 718,501, filed March 3, 1958. In other words, according to the teachings of this invention, one may preferably hydrolyze the iminopyrrolien as it is formed from the reaction of specific ketonitriles and amines or hydrolyze the iminopyrroline which has been previously prepared and isolated.

The reaction is carried out at the reflux temperature of the reaction mixture and is continued until substantially an equivalent of ammonia is evolved. The temperature range may be from 30° to 50° C. with 75° to 150° C. constituting the preferred range. The evolution of the ammonia is a criterion of reaction progress. The reaction progresses readily and yields approach a maximum. The reaction may be carried out under reduced pressure, or if the reaction is slow, superatmospheric pressure may be used in order to allow convenient attainment of higher temperatures.

The pyrrolinones prepared by the method of this invention may be represented by the formula I
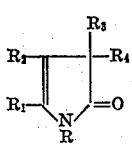

The iminopyrroline reactants may be represented by the formulas

II
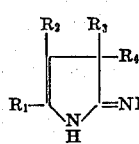

III
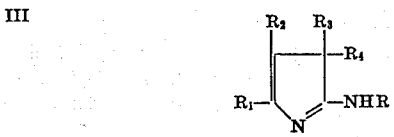

and

IV
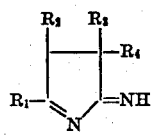

The iminopyrroline reactants are known to exist in tautomeric forms as represented by Formulas II, III, and IV. It is highly probable, based on the best laboratory evidence, that the predominent tautomeric reactant is that of Formula II but appreciable amounts of III and IV are undoubtedly present. In the present sense, Formula II will be referred to as the principle form of the three possible tautomeric structures (II, III and IV) but such a refernce is meant to include the other two (III and IV) tautomeric forms also. If the present method is conducted by using the ketonitrile and amine modification, these reactants may be represented by the formulas

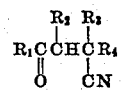

and

$RNH_2$

The symbol $R_1$ represents hydrocarbon groups of 1 to 10 carbon atoms, preferably alkyl, aralkyl, cycloalkyl, aryl and alkaryl. The symbol $R_2$ represents a hydrogen atom or an alkyl group of 1 to 4 carbon atoms. The symbols $R_3$ and $R_4$ may be hydrogen atoms or hydrocarbon groups containing from 1 to 10 carbon atoms including alkyl, aralkyl, cycloalkyl, aryl and alkaryl groups. In addition, $R_1$ and $R_2$ taken together with the carbon atoms to which they are joined may form a carbocyclic ring containing 5 to 6 carbon atoms which in turn may have alkyl substituents containing a total of no more than 4 additional carbon atoms. In addition, $R_2$ and $R_3$ taken together with the carbon atoms to which they are joined may form a carbocyclic ring containing five to six carbon atoms which in turn may have alkyl substituents containing a total of no more than 4 additional carbon atoms. In addition, $R_3$ and $R_4$ taken together with the carbon atoms to which they are joined may form a carbocyclic ring containing five to six carbon atoms which in turn may have alkyl substituents containing a total of no more than 4 additional carbon atoms. The total number of carbon atoms in the groups $R_1$, $R_2$, $R_3$, and $R_4$ should not exceed 20. The preferred embodiments are those in which $R_1$ and $R_4$ are alkyl groups, $R_2$ is a hydrogen atom, and $R_3$ is a methyl group. $R_1$, $R_3$, and $R_4$ may typically individually represent methyl, butyl, octyl, benzyl, phenylbutyl, cyclopentyl, cyclohexyl, phenyl, naphthyl, butylphenyl groups, and the like.

The symbol R represents an alkyl group of 1 to 18 carbon atoms, an alkenyl group of 3 to 18 carbon atoms, an aryl group of up to 10 carbon atoms, an aralkyl group of up to 18 carbon atoms, an alkarylalkyl group of up to 30 carbon atoms, an alkoxyalkyl group of 3 to 24 carbon atoms, a hydroxyalkyl group of 2 to 12 carbon atoms, and an alkylaminoalkyl group of 3 to 18 carbon atoms provided that the amino group is a secondary or tertiary structure, that is non-primary. Alkyl, in the above definition, is to be construed to include cycloalkyl and alkylcycloalkyl within the range of carbon atoms previously set forth.

Typical R representations are methyl, ethyl, butyl, octyl, decyl, dodecyl, octadecyl, cyclopentyl, cyclohexyl, butylcyclohexyl, octylcyclohexyl, butylcyclohexylethyl, propenyl, butenyl, hexenyl, octenyl, decenyl, dodecenyl, octadecenyl, phenyl naphthyl, benzyl, phenylethyl, phenylbutyl, phenyldodecyl, methylphenyl, ethylphenyl, butylphenyl, octylphenyl, nonylphenyl, decylphenyl, hexadecylphenyl, octadecylphenyl, methylbenzyl, ethylbenzyl, butylbenzyl, octylbenzyl, dodecylbenzyl, butylphenylbutyl, octylphenylethyl, dioctylphenylethyl, dodecylphenyloctyl, methoxyethyl, methoxypropyl, methoxyhexyl, methoxydecyl, methoxyoctadecyl, ethoxyethyl, ethoxybutyl, ethoxyoctyl, ethoxydodecyl, propoxyethyl, propoxybutyl, propoxyheptyl, propoxytetradecyl, butoxyethyl, butoxybutyl, butoxyoctyl, butoxydodecyl, butoxyoctadecyl, pentoxyethyl, pentoxybutyl, pentoxydecyl, hexoxyethyl, hexoxyhexyl, hexoxydodecyl, hexoxyoctadecyl, heptoxyethyl, heptoxyoctyl, octoxyethyl, octoxybutyl, octoxyoctyl, octoxydodecyl, nonoxypropyl, nonoxyheptyl, nonoxytridecyl, decoxyethyl, decoxyoctyl, undecoxybutyl, dodecoxypropyl, dodecoxydecyl, dodecoxydodecyl, tridecoxyethyl, tetradecoxypropyl, pentadecoxypentyl, hexadecoxybutyl, heptadecoxyethyl, octadecoxyethyl, octadecoxyhexyl, hydroxyethyl, hydroxypropyl, hydroxybutyl, hydroxypentyl, hydroxyoctyl, hydroxydecyl, hydroxydodecyl, ethylaminoethyl, propylaminoethyl, butylaminopropyl, octylaminohexyl, hexylaminooctyl, heptylaminopentyl, octylaminooctyl, nonylaminoethyl, ethylaminononyl, decylaminopropyl, propylaminododecyl, dodecylaminoethyl, dodecylaminobutyl, dodecylaminohexyl, N-methyl-N-ethylaminoethyl, N-propyl-N-ethylaminoethyl, N-butyl-N-pentylaminoethyl, N-octyl-N-hexylaminobutyl, and N-decyl-N-butylaminobutyl.

Typical iminopyrroline reactants include 2-methyl-5-dodecylimino-2-pyrroline, 2,4,4-trimethyl-5-dodecylimino-2-pyrroline, 2,4,4-trimethyl-5-octadecylimino-2-pyrroline, 4-methyl-2,4-dicyclohexyl-5-octadecylimino - 2 - pyrroline, 2,4,4-trimethyl-5-methylimino-2-pyrroline, 2,4,4-trimethyl-5-butylimino-2-pyrroline, 2,4,4-trimethyl - 5 - (3-methoxypropylimino)-2-pyrroline, 2,4 - dimethyl - 4 - neopentyl-5-(3-dimethylaminopropylimino)-2-pyrroline, 4 - methyl-4-ethyl-2-propyl-5-(2 - methyl - 2 - hydroxypropylimino)-2-pyrroline, 2,4,4-trimethyl-5-phenylimino-2-pyrroline, and 2,4,4-trimethyl-5-p-tolylimino-2-pyrroline.

Illustrative reactants having the formula RNH$_2$ are ammonia, methylamine, butenylamine, aniline, naphthylamine, benzylamine, ethylaniline, hexadecylaniline, ethylbenzylamine, dodecylphenylpropylamine, ethoxybutylamine, ethanolamine, γ-dimethylaminopropylamine, ethylene diamine, and hexamethylene diamine. It should be noted that the reactant RNH$_2$ may possess more than one amino group although one amino group is usually preferred. When more than one amino group is present in the reactant RNH$_2$, it is observed that varying quantities of alkylene bis-pyrrolinones may be produced in addition to the predominant monopyrrolinones.

The —NH$_2$ group in the reactant RNH$_2$ must be attached to a hydrogen atom or to a carbon atom that is in turn attached to no more than two other carbon atoms. Otherwise, steric hindrance is observed and the reaction is not consummated.

Typical ketonitrile reactants include 4-oxopentanonitrile, 3-methyl-4-oxopentanonitrile, 2,2-dimethyl-4-oxopentanonitrile, 2 - methyl - 2 - ethyl - 4 - oxopentanonitrile, 2-methyl-2 - propyl - 4 - oxoheptanonitrile, 2 - methyl - 2-(2,2,4,4-tetramethylpentyl)-4-oxopentanonitrile, 2-methyl-2-ethyl-4-oxoheptanonitrile, 2-methyl-2-hexyl - 4 - oxodecanonitrile, 2 - isobutyl - 2,6-dimethyl-4-oxoheptanonitrile, 2-methyl-2-neopentyl-4-oxopentanonitrile, 2 - methyl-2,4-diphenyl-4-oxobutanonitrile, 1-(2-oxocyclohexyl) - cyclohexane-carbonitrile, 2-methyl - 2,4 - dicyclohexyl - 4 - oxobutanonitrile, 2 - (4-methyl-2-oxocyclohexyl) - 2 - methylpropionitrile, 1,3,3 - trimethyl - 5 - oxocyclohexanecarbonitrile, 2-acetyl - 1 - methylcyclopentanecarbonitrile, 1-(2-oxocyclopentyl)cyclohexanecarbonitrile, 1-(1-butyl-2-oxooctyl)cyclopentanecarbonitrile, 1 - octyl - 2 - acetylcyclohexanecarbonitrile, 3,3-dimethyl-2-(2-oxopropyl)-bicyclo [2.2.1]heptane-2-carbonitrile, 2-benzoyl - 1 - methylcyclopentanecarbonitrile, and 2-butyl-2-naphthyl-4-oxobutanonitrile.

The present reaction, regardless of which of the modifications previously described is employed, is conducted in an aqueous medium. If an iminopyrroline reactant is used, then water or water and an amine having the formula RNH$_2$ is employed as a solvent. The modification employing a ketonitrile and amine is conducted in the presence of water without the necessity of any additional solvent materials. At the conclusion of the reaction, it is only necessary to separate the pyrrolinone products from any excess water or water and amine present, which may be accomplished by conventional methods such as by distillation. The pyrrolinone products are then available for a range of known uses, such as aphicides, fungicides, and miticides, in a known manner.

The process of the present invention may be more fully understood from the following examples which are offered by way of illustration and not by way of limitation. Parts by weight are used throughout.

*Example 1*

There are added to a reaction vessel, capable of being cooled, 2,2-dimethyl-4-oxopentanonitrile (500 parts) and aqueous 40% methylamine (625 parts). Cooling is applied to keep the reaction temperature below 90° C. After the exothermic reaction has subsided, the solution is boiled under reflux for 46 hours. The reaction mixture is then fractionated and the product, 1,2,4,4-tetramethyl-2-pyrrolin-5-one (boiling point—83° C. at 20 mm. absolute pressure and $n_D^{25}$ 1.4811), is obtained in a yield of 369 parts. The product contains 10.00% nitrogen (10.06% theoretical). From the foreruns, an additional 27 parts (boiling point—188°–190° C. at 760 mm. absolute pressure and $n_D^{25}$ 1.4805) is obtained.

In a similar fashion 2 - methyl - 4 - oxopentanonitrile, 2-methyl-2-(2,2 - dimethylpropyl) - 4 - oxopentanonitrile, 2-methyl-2-hexyl-4-oxodecanonitrile and 1-(2-oxocyclohexyl) - cyclohexane - carbonitrile treated with aqueous monomethylamine give 1,2,4-trimethyl-2-pyrrolin-5-one, 1,2,4-trimethyl-4-(2,2-dimethylpropyl) - 2-pyrrolin-5-one, 1,4-dimethyl-2,4-dihexyl-2-pyrrolin-5-one and 1-methyl-3,3-pentamethylene - 2,3,4,5,6,7 - hexahydroindol - 2 - one respectively. Similarly aqueous 40% ethylamine solution when mixed and heated with 2,2-dimethyl-4-oxopentanonitrile, 2-methyl-2-propyl-4-oxoheptanonitrile and 2-acetyl-1-methylcyclohexanecarbonitrile gives 1-ethyl-2,4,4-trimethyl-2-pyrrolin-5-one, 1-ethyl-4-methyl-2,4-dipropyl-2-pyrrolin-5-one and 2-ethyl-3,6a - dimethyl - 1,4,5,6,7,7a-hexahydroisoindol-1-one, respectively.

*Example 2*

There are added to a reaction vessel 2,2-dimethyl-4-oxopentanonitrile (62.5 parts), 1-(2-phenylethyl)-amine (196 parts), and water (100 parts). The reaction mixture is heated at reflux for 44 hours. The aqueous layer is separated and the organic layer is fractionally distilled. The product, 1-(2-phenylethyl)-2,4,4-trimethyl-2-pyrrolin-5-one (has a boiling point—115°–116° C. at 0.8 mm. absolute pressure and $n_D^{25}$ 1.5304), was obtained in a yield of 94 parts. The product contains 6.1% nitrogen (6.1% theoretical).

*Example 3*

In a fashion similar to that of Example 2, the compounds of the accompanying table are prepared. This table shows the physical properties and analytical data of these products.

| Structure | Molecular Weight | Boiling Point, °C. (millimeters absolute pressure) | $n_D^{25}$ | Analysis, Percent Nitrogen Calculated | Analysis, Percent Nitrogen Found |
|---|---|---|---|---|---|
| 1-(n-butyl)-2,4,4-trimethyl-2-pyrrolin-5-one | 181.27 | 113 (14 mm.) | 1.4711 | 7.73 | 7.70 |
| 1-(n-dodecyl)-2,4,4-trimethyl-2-pyrrolin-5-one | 293.48 | 179–81.5 (2.6) | 1.4681 | 4.77 | 4.85 |
| 1-phenyl-2,4,4-trimethyl-2-pyrrolin-5-one | 207.31 | 145–48 (0.2) | 1.4942 | 6.76 | 7.00 |
| 1-benzyl-2,4,4-trimethyl-2-pyrrolin-5-one | 215.28 | 137 (4) | 1.5383 | 6.51 | 6.50 |
| 1-isobutyl-2,4,4-tri-isobutyl-2-pyrrolin-5-one | 265.43 | 100 (0.9 mm.) | 1.4710 | 5.28 | 5.20 |
| 1-benzyl-2,4,4-tri-isobutyl-2-pyrrolin-5-one | 299.44 | 133 (0.1 mm.) | 1.5141 | 4.68 | 4.62 |

Example 4

A mixture of ethylenediamine (15 parts), water (10 parts), and 2,2-dimethyl-4-oxopentanonitrile (31 parts) is boiled under reflux for 20 hours. During the first few hours, ammonia is vigorously evolved. The reaction mixture is then distilled under reduced pressure. The major component (31.4 parts), 1 - (2 - aminoethyl) - 2,4,4-trimethyl-2-pyrrolin-5-one, has a boiling point—132°–137° C. at 15 mm. absolute pressure and a neutral equivalent 175. The product contains 16.60% nitrogen (16.65% theoretical). A higher boiling component (2 parts), (boiling point—173–180° C. at 15 mm. absolute pressure) solidified on cooling. It is shown to be 1,2-bis-(2,4,4-trimethyl-2-pyrrolin-4-on-1-yl)-ethane. The product contains 10.40% nitrogen (10.14% theoretical).

In a similar fashion 2,2-dimethyl-4-oxopentanonitrile and propylenediamine gives 1-(2-aminopropyl)-2,4,4-trimethyl-2-pyrrolin-5-one, 2,2-dimethyl - 4 - oxopentanonitrile and hexamethylenediamine gives 1-(6-aminohexyl)-2,4,4-trimethyl-2-pyrrolin - 5 - one. Similarly, 2-methyl-2-neopentyl-4-oxopentanonitrile and ethylenediamine give 1-(2-aminoethyl)-2,4-dimethyl-4 - neopentyl - 2 - pyrrolin-5-one, 2-methyl-2-hexyl-4-oxodecanonitrile and 2-methyl-1,2-diaminopropane give 1-(2 - methyl-2 - aminopropyl)-2,4-dihexyl-4-methyl-2-pyrrolin-5-one, and 1-(2-oxocyclohexyl)-cyclohexanecarbonitrile and 1,3-diaminopropane give 1-(3-aminopropyl)-3,3 - pentamethylene - 2,3,4,5,6,7-hexahydroindol-2-one.

Example 5

There are introduced into a reaction vessel 2,2-dimethyl-4-oxopentanonitrile (25 parts), o-phenylenediamine (28 parts), water (40 parts) and concentrated hydrochloric acid (0.1 part). The reaction mixture is heated for four hours. The solid product that is formed is filtered and ground in a mortar and refluxed with the filtrate for an additional period of twenty-four hours. The reaction product is dissolved in acetone, decolorized with charcoal and recrystallized from a mixture of benzene and acetone. The product (35 parts) has melting point 222–224° C. and was 1-(o-aminophenyl)-2,4,4-trimethyl-2-pyrrolin-5-one. The product contains 72.16% carbon (72.19% theoretical), 7.64% hydrogen (7.48% theoretical), 12.83% nitrogen (12.95% theoretical) and has a neutral equivalent of 223.5 (216 theoretical).

In a similar manner 1-(4-aminophenyl)-2,4,4-trimethyl-2-pyrrolin-5-one is prepared from p-phenylenediamine and 2,2 - dimethyl - 4 - oxopentanonitrile, 1-(3-amino-4-methylphenyl)-2,4-dihexyl-4-methyl-2-pyrrolin-5-one is prepared from 2,4-diaminotoluene and 2-methyl-2-hexyl-4-oxodecanonitrile and 1-(4-dimethylaminophenyl)-2,4,4-trimethyl-2-pyrrolin-5-one is prepared from 4-dimethyl-aminoaniline and 2,2-dimethyl-4-oxopentanonitrile.

*Example 6*

There are added to a reaction vessel 2,4,4-trimethyl-5-benzylimino-2-pyrroline (21.4 parts) and water (10 parts). The reaction mixture is heated under reflux until no more ammonia is evolved. The product is distilled under reduced pressure and gives 1-benzyl-2,4,4-trimethyl-2-pyrrolin-5-one (boiling point—137° C. at 4 mm. absolute pressure and $n_D^{25}$ 1.5383). In a similar manner are prepared 1-p-tolyl-2,4,4-trimethyl-2-pyrrolin-5-one, 1,2,4,4-tetramethyl-2-pyrrolin-5-one, 1-(3-dimethylaminopropyl)-2,4-dimethyl-4-neopentyl-2-pyrrolin-5-one and 1-(3-methoxypropyl)-2,4,4-trimethyl-2-pyrrolin-5-one from 2,4,4-trimethyl-5-p-tolylimino - 2 - pyrroline, 2,4,4 - trimethyl-5-methylimino-2-pyrroline, 2,4 - dimethyl-4-neopentyl-5-(3-dimethylaminopropylimino) - 2 - pyrroline, and 2,4,4-trimethyl-5-(3-methoxypropylimino) - 2 - pyrroline, respectively.

*Example 7*

There are added to a reaction vessel 2,2-dimethyl-4-oxopentanonitrile (125 parts), ethanolamine (122 parts), and water (36 parts) are boiled under reflux until ammonia is no longer detected over the reflux condenser. The reaction mixture is distilled under reduced pressure to give the product 1-(2-hydroxyethyl)-2,4,4-trimethyl-2-pyrrolin-5-one in 80% yield. This product has an $n_D^{25}$ value of 1.4932 and a boiling point of 121° C. at 6 mm. absolute pressure. The product contains 63.80% carbon (63.88% theoretical); 8.93% hydrogen (8.94% theoretical), and 8.46% nitrogen (8.28% theoretical).

In a similar fashion, 2,2-dimethyl-4-oxopentanonitrile and 2-hydroxypropylamine give 1-(2-hydroxypropyl)-2,4,4 - trimethyl - 2 - pyrrolin-5-one, 2-methyl-2-ethyl-4-oxopentanonitrile and 3-hydroxypropylamine give 1-(3-hydroxypropyl)-2,4-dimethyl-4-ethyl-2-pyrrolin-5-one, 2-(2 - methylpropyl)-2,6-dimethyl-4-oxoheptanonitrile and ethanolamine give 1-(2-hydroxyethyl)-2,4-di(2-methylpropyl)-4-methyl-2-pyrrolin-5-one, and 2-(4-methyl-2-oxocyclohexyl)-2-methylpropionitrile and 2-(2-hydroxyethylamino)ethylamine give 1-[2-(2-hydroxyethylamino)-ethyl]-3,3,6-trimethyl-2,3,4,5,6,7-hexahydroindol-2-one.

*Example 8*

There are added to a reaction vessel 2,3-dihydro-5,7,7-trimethyl-(7H)-imidazo[1,2-a]pyrrole (75 parts) and water (18 parts). The reaction mixture is heated under reflux for twenty-four hours. The mixture is then distilled under reduced pressure to give 1-(2-aminoethyl)-3,5,5-trimethyl-2-pyrrolin-5-one in 95% yield. In a similar manner 2,3 - dihydro - 5,7 - dimethyl-7-hexyl-(7H)-imidazo[1,2-a]-pyrrole gives 1 - (2 - aminoethyl)-2,4-dimethyl-4-hexyl-2-pyrrolin - 5 - one, 2,3 - dihydro - 2(or 3),5,7,7-tetramethyl-(7H)-imidazo[1,2-a]pyrrole gives 1-(2-aminopropyl)-2,4,4-trimethyl-2-pyrrolin - 5 - one, and spiro{3,3 - dimethylbicyclo(2.2.1)heptane - 2,7′ - [2′(or 3′),5′ - dimethyl-2′,3′-dihydro-(7′H)-imidazo[1,2-a]pyrrole]} gives spiro{3,3-dimethylbicyclo(2.2.1)heptane-2,4′-[1′-(2′-aminopropyl)-2′,5′-dimethyl-2′-pyrroline-5-one]}.

*Example 9*

There are combined in a stirring autoclave 5-dodecylimino-2,4,4-trimethyl-2-pyrroline (105 parts) and water (100 parts). The reaction vessel is sealed and the contents are heated with stirring to 200° C. and maintained at this temperature for eighteen hours. A pressure of 225 p.s.i.g. is obtained when the temperature first reaches 200° C. but this gradually falls as the reaction proceeds. A 60 p.s.i.g. drop in pressure is observed in the first five hours. Distillation of the reaction mixture gives 73 parts (yield 70%) of 1-dodecyl-2,4,4-trimethyl-2-pyrrolin -5-one (boiling point—189°–190° C. at 1.4 mm. absolute pressure and $n_D^{25}$ 1.4682–1.4688.)

We claim:

1. A method for the preparation of a compound having the formula

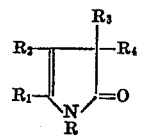

which comprises heating and thereby reacting the compound whose predominant tautomeric structure has the formula

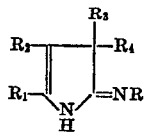

in an aqueous medium at a temperature of about 30° to 250° C. until substantially an equivalent of ammonia is evolved, in which $R_1$ taken individually represents a member from the class consisting of alkyl, phenylalkyl, cycloalkyl, phenyl, naphthyl, and alkylphenyl groups of up to 10 carbon atoms, $R_2$ taken individually represents a member from the class consisting of hydrogen and alkyl groups of 1 to 4 carbon atoms, $R_3$ and $R_4$ taken individually represent members from the class consisting of hydrogen and alkyl, cycloalkyl, phenylalkyl, phenyl, naphthyl, and alkylphenyl groups of up to 10 carbon atoms, $R_1$ and $R_2$ taken collectively with the carbon atoms to which they are joined form a member from the class consisting of a carbocyclic ring of 5 to 6 carbon atoms and said ring having alkyl substituents consisting of a total of up to 4 carbon atoms, $R_2$ and $R_3$ taken collectively with the carbon atoms to which they are joined form a member from the class consisting of a carbocyclic ring of 5 to 6 carbon atoms and said ring having alkyl substituents consisting of a total of up to 4 carbon atoms, $R_3$ and $R_4$ taken collectively with the carbon atoms to which they are joined form a member from the class consisting of a carbocyclic ring of 5 to 6 carbon atoms and said ring having alkyl substituents consisting of a total of up to 4 carbon atoms, and R is a member from the class consisting of alkyl groups of 1 to 18 carbon atoms, alkenyl groups of 3 to 18 carbon atoms, phenyl, naphthyl and phenylalkyl groups of up to 18 carbon atoms, alkylphenylalkyl groups of up to 30 carbon atoms, alkoxyalkyl groups of 3 to 24 carbon atoms, hydroxyalkyl groups of 2 to 12 carbon atoms, and alkylaminoalkyl groups of 3 to 18 carbon atoms.

2. A method according to claim 1 in which the reaction is carried out at the reflux temperature of the reaction mixture in the range of about 75° to 150° C.

3. A method for the preparation of a compound having the formula

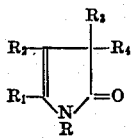

which comprises hydrolyzing a compound whose predominant tautomeric structure has the formula

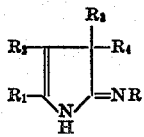

in an aqueous medium at the reflux temperature of the reaction mixture in the range of about 30° to 250° C. until substantially an equivalent of ammonia is evolved, in which R is alkyl of 1 to 10 carbon atoms, $R_2$ is hydrogen, and $R_1$, $R_3$, and $R_4$ are alkyl groups of 1 to 10 carbon atoms.

4. A method for the preparation of a compound having the formula

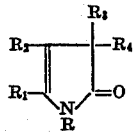

which comprises heating and thereby reacting the compound whose predominant tautomeric structure has the formula

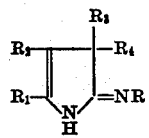

in an aqueous medium at the reflux temperature of the reaction mixture in the range of about 30 to 250° C. until substantially an equivalent of ammonia is evolved in which R is an alkyl group of 1 to 18 carbon atoms, $R_1$ and $R_2$ taken collectively with the carbon atoms to which they are joined form a carbocyclic ring of 5 to 6 carbon atoms, and $R_3$ and $R_4$ taken collectively with the carbon atom to which they are joined form a carbocyclic ring of 5 to 6 carbon atoms.

5. A method for the preparation of a compound having the formula

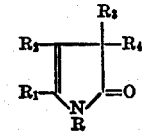

which comprises heating and thereby reacting in an aqueous medium at the reflux temperature of the reaction mixture in the temperature range of about 30° to 250° C. until substantially an equivalent of ammonia is evolved, the compounds having the formulas

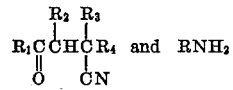

in which $R_1$ taken individually represents a member from the class consisting of alkyl, phenylalkyl, cycloalkyl, phenyl, naphthyl, and alkylphenyl groups of up to 10 carbon atoms, $R_2$ taken individually represents a member from the class consisting of hydrogen and alkyl groups of 1 to 4 carbon atoms, $R_3$ and $R_4$ taken individually represent members from the class consisting of hydrogen and alkyl, cycloalkyl, phenylalkyl, phenyl, naphthyl, and alkylphenyl groups of up to 10 carbon atoms, $R_1$ and $R_2$ taken collectively with the carbon atoms to which they are joined form a member from the class consisting of a carbocyclic ring of 5 to 6 carbon atoms, and said having alkyl substituents consisting of a total of up to 4 carbon atoms, $R_2$ and $R_3$ taken collectively with the carbon atoms to which they are joined form a member from the class consisting of a carbocyclic ring of 5 to 6 carbon atoms and said ring having alkyl substituents consisting of a total of up to 4 carbon atoms, $R_3$ and $R_4$ taken collectively with the carbon atoms to which they are joined form a member from the class consisting of a carbocyclic ring of 5 to 6 carbon atoms and said ring having alkyl substituents consisting of a total of up to 4 carbon atoms, and R is a member from the class consisting of alkyl groups of 1 to 18 carbon atoms, alkenyl groups of 3 to 18 carbon atoms, phenyl, naphthyl and phenylalkyl groups of up to 18 carbon atoms, alkylphenylalkyl groups of up to 30 carbon atoms, alkoxyalkyl groups of 3 to 24 carbon atoms, hydroxyalkyl groups of 2 to 12 carbon atoms, and alkylaminoalkyl groups of 3 to 18 carbon atoms.

6. A method according to claim 5 in which the temperature range is about 75° to 150° C.

References Cited in the file of this patent

UNITED STATES PATENTS

| | | |
|---|---|---|
| 1,083,518 | Bauer | Jan. 6, 1914 |
| 1,792,170 | Kranzlein et al. | Feb. 10, 1931 |
| 2,086,805 | Hoare | July 13, 1937 |
| 2,417,046 | Brooks et al. | Mar. 11, 1947 |
| 2,469,830 | Knott | May 10, 1949 |
| 2,580,738 | de Benneville et al. | Jan. 1, 1952 |
| 2,742,475 | Hoffmann et al. | Apr. 17, 1956 |

FOREIGN PATENTS

| | | |
|---|---|---|
| 320,647 | Germany | Apr. 26, 1920 |
| 699,032 | Germany | Nov. 25, 1940 |